United States Patent [19]
Flournoy et al.

[11] 3,915,230
[45] Oct. 28, 1975

[54] SURFACTANT OIL RECOVERY PROCESS

[75] Inventors: Kenoth H. Flournoy; Joseph T. Carlin; Ricardo L. Cardenas, all of Houston, Tex.

[73] Assignee: Texaco Inc., New York, N.Y.

[22] Filed: May 31, 1974

[21] Appl. No.: 475,211

Related U.S. Application Data

[63] Continuation-in-part of Ser. No. 314,870, Dec. 13, 1972, abandoned.

[52] U.S. Cl. .............................. 166/252; 166/273
[51] Int. Cl.$^2$ ................................. E21B 43/22
[58] Field of Search ................... 166/273–275, 166/252, 305 R

[56] References Cited
UNITED STATES PATENTS

| | | | |
|---|---|---|---|
| 3,261,399 | 7/1966 | Coppel | 166/273 |
| 3,372,748 | 3/1968 | Cook | 166/273 X |
| 3,399,725 | 9/1968 | Pye | 166/275 |
| 3,421,582 | 1/1969 | Fallgatter | 166/273 |
| 3,467,190 | 9/1969 | Dunlap et al. | 166/252 |
| 3,478,823 | 11/1969 | Murphy | 166/274 |
| 3,482,631 | 12/1969 | Jones | 166/273 |
| 3,648,770 | 3/1972 | Sydansk et al. | 166/252 |
| 3,707,187 | 12/1972 | Knight | 166/273 X |
| 3,741,307 | 6/1973 | Sandiford et al. | 166/273 |

*Primary Examiner*—Stephen J. Novosad
*Attorney, Agent, or Firm*—T. H. Whaley; C. G. Ries; Jack H. Park

[57] ABSTRACT

The efficiency of an oil recovery process of the type wherein an aqueous surfactant solution is injected into a subterranean, petroleum-containing formation is increased by determining the optimum range of salinity and hardness, e.g. calcium and magnesium, for the particular surfactant being used, and formulating an aqueous preflush solution, the salinity and hardness of which are within the range for optimum surfactant effectiveness, and adding an effective amount of hydrophilic polymer to yield a suitable viscosity greater than the formation water viscosity, and injecting the aqueous preflush solution into the formation prior to injection of the surfactant solution. The viscous, controlled salinity and hardness solution displaces the formation water effectively, thereby insuring that the salinity and hardness of the surfactant solution will be at or near an optimum value for oil recovery. Suitable hydrophilic polymers include polyacrylamide, polysaccharide, polyvinyl aromatic sulfonate, polyethylene oxide, methyl cellulose, or carboxy methyl cellulose.

21 Claims, No Drawings

SURFACTANT OIL RECOVERY PROCESS

CROSS REFERENCE TO RELATED APPLICATION

This application is a Continuation-in-Part of our copending application Ser. No. 314,870 filed Dec. 13, 1972, now abandoned.

BACKGROUND OF THE INVENTION

1. Field of the Invention

This invention relates to recovery of petroleum from subterranean petroleum-containing formations. More particularly, this invention relates to a method for recovering petroleum from such formations by the injection of flood water containing a surfactant. A specific embodiment involves the injection of a viscous aqueous preflush solution of controlled salinity and/or hardness water having dissolved therein a hydrophilic polymeric material to efficiently displace the formation water.

2. Prior Art

Many subterranean, petroleum-containing formations contain natural energy in the form of active bottom water drive, solution gas drive, or gas cap drive, in sufficient quantity to drive the petroleum to the production well from which it can be transported to the surface. This phase of oil recovery, known as primary recovery, recovers only a portion of the petroleum originally in place. When the natural energy source has been depleted, or in those formations where insufficient natural energy was originally present to permit primary recovery, some form of supplemental treatment is required to recover additional oil from the formation. Water flooding is by far the most economical and widely practiced supplemental recovery procedure. Water flooding is accomplished by injecting water into the formation via one or more injection wells. The injected water displaces and moves the petroleum toward one or more production wells, where it is transported to the surface. Water flooding is also quite inefficient, and 50 percent or more of the original oil usually remains in the formation at the termination of conventional water flooding operations.

Numerous factors are responsible for the failure of water flooding to recover a higher percentage of the oil remaining in the formation after primary recovery. A low viscosity fluid displaces a higher viscosity fluid quite inefficiently, because the low viscosity displacing fluid channels through the high viscosity fluid. The displacement efficiency can be related mathematically to the mobility ratio of the displacing and displaced fluids. Various additives have been proposed in the prior art to alleviate this problem. Hydrophilic polymers which increase the viscosity of the displacing fluid, improve the mobility ratio and decrease the tendency for the displacing fluid to channel or finger into an inefficiently displace the higher viscosity petroleum. U.S. Pat. No. 3,039,529 (1962) discloses the use of polyacrylamide polymer to increase the viscosity of injected water to improve the mobility ratio and hence the oil displacement efficiency of an oil recovery process. U.S. Pat. No. 3,282,337 describes the use of polyethylene oxide as a thickener for injection water for the same purpose.

The immiscibility of water and petroleum, and the high surface tension existing between water and petroleum is a major cause of the inefficient displacement of oil by water. The use of a surfactant to lower this surface tension will improve the displacement efficiency. For example, U.S. Pat. No. 2,233,381 (1941) discloses the use of polyglycol ether as a surfactant in an oil recovery process. U.S. Pat. No. 3,032,713 (1967) discloses the use of a particular petroleum sulfonate as a surfactant for oil recovery. U.S. Pat. No. 3,468,377 describes the use of petroleum sulfonates having a specified molecular weight distribution as a surfactant for oil recovery.

The combined use of a surfactant solution to decrease the surface tension between the injected aqueous fluid and the petroleum contained in the formation, and a solution of a polymeric material to improve the mobility ratio and displacement efficiency provide a very efficient petroleum recovery process. For example, U.S. Pat. No. 3,477,511 (1969) describes the use of a surfactant solution followed by thickened water to displace the surfactant solution through the formation. Many other combinations of surfactants and water thickening polymers have been proposed, all sharing the common feature of specifying that the surfactant must precede the viscous fluid for optimum recovery efficiency.

Most surfactants proposed in the prior art for reducing the surface tension between the injected aqueous fluid and the formation petroleum, require a fluid environment whose salinity and/or hardness is within specific values in order to function with optimum effectiveness. For example, many of the petroleum sulfonates which would otherwise be the surfactant of choice in supplementary oil recovery operations because of their high surface activity and relatively low cost, require a salinity less than 2 percent by weight and a hardness less than 500 parts per million to function effectively, and their optimum performance is realized only at even lower salinity and hardness values. As an illustration of the recognition of this problem, a paper presented at the Society of Petroleum Engineers meeting at Tulsa, Oklahoma, in April, 1972, entitled "A Field Test of Surfactant Flooding" by S. A. Pursley, R. N. Healy, and E. I. Sandvik, describes a field pilot test employing a petroleum sulfonate surfactant in a biopolymer polymeric thickening material. The surfactant chosen required a lower salinity environment than was present in the formation to achieve the maximum reduction in surface tension. A low salinity or fresh water preflush was used in an attempt to reduce the salinity of the formation water in advance of the aqueous solution containing the surfactant. The authors of the paper concluded that the fresh water preflush was not a satisfactory method of reducing the formation water salinity to a level which would permit the surfactant to function at its maximum effectiveness, and expressed the opinion that the only satisfactory solution would be to utilize a surfactant system having an inherently high tolerance to salinity. The salinity of the formation water in the particular field test described in this paper was approximately 100,000 parts per million or 10 percent by weight. While this is a high salinity, certainly too high to permit the use of a high salinity sensitive surfactant such as petroleum sulfonate, this is by no means an abnormally high salt content for petroleum reservoirs. Reservoirs are known in which formation waters have salt concentrations of 250,000 parts per million or 25 percent by weight. Many such reservoirs also contain other interfering ions such as divalent ions including calcium and magnesium, which interfere with the proper function of many surfactants such as petroleum sulfonate.

U.S. Pat. No. 3,482,631, Jones, teaches the use of an aqueous preflush solution containing a hydrophilic polymer as a viscosifier in advance of a micellar dispersion or an emulsion type of displacing fluid in order to displace interfering ions including monovalent (sodium or potassium) or divalent ions (calcium or magnesium). It is well known that in two phase systems such as emulsions or micellar dispersions, that surfactants accumulate at the interface between the continuous and discontinuous phases, and so in emulsions having 30–60 percent by volume hydrocarbon as the discontinuous phase, the surfactant is concentrated in the interfacial zone and so it would be expected that surfactants would exhibit much less sensitivity to interfering ions in the instance of using emulsion type displacement fluids than when present in single aqueous phase displacement fluids. The micellar dispersions are special types of emulsions wherein the discontinuous (usually nonaqueous) phase is dispersed to a higher degree than more conventional emulsions. Although they are frequently described as "true solutions" because they appear clear, in fact the discrete discontinuous nonaqueous phase is still present. The "solution-like" appearance of micellar dispersions results from much smaller "particle" sizes of the dispersed phase. Thus in comparing emulsions and micellar dispersions having equivalent total non-aqueous phase content, the micellar dispersion would have a larger number of discrete zones of the non-aqueous phase and hence the interfacial zone would be larger in area than that of the emulsion. Thus the surfactant present in a micellar dispersion would be even more prone to accumulate at the interfacial zone than it would in a conventional emulsion, and so little sensitivity to water hardness or salinity would be expected. The cost of operating a tertiary recovery project using an emulsion or micellar dispersion as the displacing fluid is usually prohibitively large, however, because of the large concentration of hydrocarbons and so there is a substantial commercial need for a method for using essentially single, aqueous phase surfactant solutions in oil recovery without incurring problems from salinity or hardness of formation water.

The salinity sensitivity of the most desirable surfactants for use in oil recovery has a substantial impact on the economics of a proposed supplemental recovery operation employing a surfactant. While it has been generally recognized in the industry for many years that surfactants capable of reducing the interfacial tension between the injected fluid and the formation petroleum would improve the oil recovery efficiency of a supplemental oil recovery program, it has never been demonstrated that the additional oil which can be recovered under field conditions is sufficient to justify the cost of the surfactant. This is especially true because of the enormous quantity of surfactant which must be employed in a field, in order to have a significant effect on the displacement efficiency. If high formation water salinity results in a shift in surfactant choice to a higher cost material or if a greater concentration of surfactant must be used, the cost of a surfactant flood will be increased substantially. It is known, however, that many millions of barrels of oil remain unrecovered in a petroleum reservoir at the conclusion of conventional water flooding operations, and with the current shortage of readily recoverable crude oil, it is becoming a matter of paramount national importance to devise a reasonably economical method of recovering this oil.

SUMMARY OF THE INVENTION

In accordance with the present invention, there is provided a new and improved surfactant flood oil recovery process whereby formation water is effectively displaced by injecting into the formation a preflush solution comprising a controlled salinity and/or hardness aqueous fluid having dissolved therein a small amount of a hydrophilic polymer to increase the viscosity of the preflush solution so that it will more efficiently sweep and displace the formation water. Any type of water thickener or polymer may be used, such as polyacrylamide, polysaccharide, methyl cellulose, carboxy methyl cellulose, polyethylene oxide, polyvinyl aromatic sulfonate. The salinity and/or hardness of the preflush is adjusted to provide an optimum aqueous environment for the surfactant injected thereafter, e.g. the preflush salinity and/or hardness level is made to coincide with the concentration at which the surfactant being used exhibits minimum interfacial tension and maximum oil displacement efficiency. This may require that the salinity and/or hardness of the preflush be greater or less than the salinity and/or hardness of the formation water, depending on the surfactant used.

From about 50 parts per million to about 2,000 parts per million of a hydrophilic polymer such as polyacrylamide, which results in an increased injection fluid viscosity to a value greater than the viscosity of the formation water is sufficient to effectively increase the efficiency of displacement of formation water by the controlled salinity and hardness preflush solution. The thickened, controlled salinity and/or hardness aqueous preflush solution may be followed directly by the surfactant solution, or an untreated water isolation slug may be used between the preflush solution and the surfactant solution. Alternatively, the polymer concentration in the preflush solution may be decreased gradually or tapered to more nearly match the viscosity of the following surfactant solution. The surfactant solution may then be displaced by the injection of water, or it may be followed by a thickened water to more efficiently move the surfactant solution through the formation. Depending on the existence of other problems which may be anticipated or known to exist, other chemical treating agents may be included in the preflush slug, such as sacrificial adsorption agents which adsorb on the formation rock to prevent adsorption of the subsequently injected surfactants or hydrophilic polymeric materials, or chemicals to desensitize water sensitive clays present in the formation to prevent permeability loss due to swelling of such clays on contact with fresh water. By the use of this aqueous controlled salinity and/or hardness, polymer containing preflush solution, many chemicals such as detergents, emulsifiers, foaming agents, which provide optimum performance only in a narrow range of hardness and salinity, may be used in formations having water whose salinity and/or hardness is incompatible with the particular surfactant being used.

DESCRIPTION OF THE SPECIFIC EMBODIMENTS

In practicing this invention, an aqueous solution of the selected hydrophilic polymeric thickener is injected through an injection well and into the subterranean petroleum-containing formation. The salinity and/or hardness of this aqueous solution should be adjusted to essentially match the salinity and/or hardness at which the surfactant being used in the process exhibits the minimum interfacial tension, and so also results in the maximum oil recovery efficiency. Petroleum sulfonates ordinarily require a minimum hardness and salinity and so the preflush will be relatively fresh, usually much less salinity and hardness than the formation water. Generally, petroleum sulfonates operate under optimum conditions when the salinity is from 0 to about 20,000 parts per million, and the hardness, e.g. the concentration of polyvalent ions such as calcium and magnesium, is from about 0 to about 500 and preferably from about 0 to about 50 parts per million.

Certain surfactants, and especially special formulations of multiple component surfactant solutions, have an optimum salinity and concentration of divalent ions such as calcium and magnesium, at which point the performance of the surfactant solution is substantially superior to the performance in water having either less or greater salinity and hardness. For example, in co-pending application Ser. No. 327,265 filed Jan. 29, 1973, now U.S. Pat. No. 3,811,505, a dual surfactant combination comprising an anionic surfactant such as an alkyl or alkylaryl sulfonate or petroleum sulfonate and a nonionic surfactant such as an ethoxylated alkyl phenol operable only in aqueous systems having from about 500 to about 9,000 parts per million calcium and magnesium is disclosed. In co-pending application Ser. No. 330,933 filed Feb. 9, 1973, now U.S. Pat. No. 3,811,504, there is disclosed a three component surfactant combination comprising a first anionic surfactant which may be an alkyl or alkylaryl sulfonate or petroleum sulfonate, a second anionic surfactant such as an alkyl polyethoxy sulfate and a nonionic surfactant such as a polyethoxylated alkyl phenol, a polyethoxylated aliphatic alcohol or a fatty acid mono- or dialkanolamide which is operable only in an aqueous environment having from about 1,500 to about 12,000 parts per million calcium and/or magnesium. In co-pending application Ser. No. 338,117 filed Mar. 5, 1973, now U.S. Pat. No. 3,811,507 there is disclosed a dual surfactant combination comprising a first anionic surfactant such as a linear alkyl or alkylaryl sulfonate plus a second anionic surfactant such as an alkyl polyethoxy sulfate, which is operable only in an aqueous medium having from about 3,000 to about 18,000 parts per million polyvalent ions such as calcium and/or magnesium.

The optimum salinity and hardness may be determined in several ways. The interfacial tension may be measured directly by methods well known in the art. By varying the salinity and hardness and measuring the interfacial tension, the optimum range that corresponds to the lowest interfacial tension may be determined. Capillary displacement tests, as are described in copending application Ser. No. 327,265, now U.S. Pat. No. 3,811,505, are also effective for this purpose. Oil displacement efficiency from cores or sand packs using surfactant solutions may be determined using solutions of varying salinity and hardness and the optimum range determined by identifying the salinity and hardness for which the maximum oil recovery is obtained.

Usually surfactant flooding is conducted in formations which have previously been subjected to conventional water flooding, although this is not essential for the practice of this invention. The aqueous preflush solution containing the polymeric thickener is followed by an aqueous surfactant solution, which is in turn followed by the injection of water. Water injection is continued, and the injected water displaces the oil within the subterranean petroleum-containing formation and moves it, together with the surfactant solution, toward one or more production wells. Energy for the displacement process is furnished by the pumps injecting the aqueous fluids and water into the injection well, which forces the oil through the formation to the production wells and then to the surface of the earth. By incorporating a small amount of polymeric material in the preflush, for example from about 50 to about 2,000 and preferably from 100 to 500 parts per million of a polymer such as polyacrylamide in the aqueous preflush solution, the formation water is efficiently displaced from the formation pores and replaced by the preflush to insure that the subsequently injected surfactant solution is exposed to the proper salinity and hardness for optimum performance.

The mechanism responsible for the improved displacement of formation water by the controlled hardness and salinity water containing the polymeric material is not completely understood. Since the apparent viscosity of the formation water is not measurably greater than the apparent viscosity of the preflush, one skilled in the art of oil recovery would expect that injection of a slug of water containing no polymeric materials could effectively displace the formation water. Surprisingly, this has been found not to be the case. Inclusion in the aqueous preflush solution of only 250 parts per million of polyacrylamide, for example, which yields an apparent viscosity of only 7 centipoise (at a shear rate of 300 reciprocal seconds), substantially improves the efficiency of displacement of formation water through the formation flow channels.

Numerous polymers are usable in our invention, and one of the most satisfactory is a hydrolized polyacrylamide which may be graphically illustrated by the following formula:

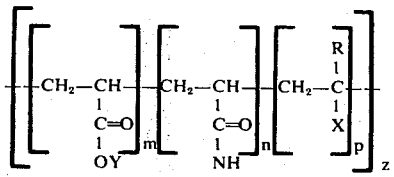

wherein Y represents hydrogen, ammonium, and alkali metal or an alkaline earth metal, R represents hydrogen or a metal radical, X represents chlorine, a lower alkoxy or acyloxy group or a cyanide radical, $m$ ranges from 12 to 67, $n$ ranges from 33 to 88, $p$ ranges from 0 to 10, and the sum of $m$, $n$, and $p$ equals 100, and $z$ is at least about 60. This class of polymers is known for the purpose of increasing the viscosity of the injected fluid and the efficiency with which the injected fluid displaces petroleum, specifically being disclosed in U.S. Pat. No. 3,039,529 (1962).

Other excellent polymers for use in the aqueous preflush solution for the practice of the subject invention are the polyvinyl aromatic sulfonates having relatively high molecular weights and yet being soluble in water. Polymers of this class have the following general formula:

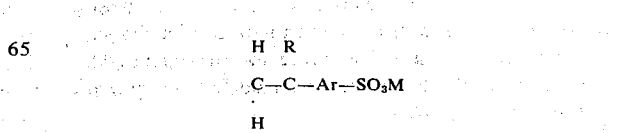

wherein Ar is a divalent monocyclic hydrocarbon unit such as benzene or benzene derivatives, r is hydrogen or a metal ion, and M is hydrogen, sodium or potassium. The use of this polymer for mobility ratio improvement in oil recovery operations is more fully detailed in U.S. Pat. No. 3,282,337 (1966).

Another class of hydrophilic polymers which can be used to thicken the low salinity aqueous preflush of the subject invention is the flocculant grade water soluble polyethylene oxides such as are described in U.S. Pat. No. 3,021,231. The use of such polyethylene oxides to thicken injected water for displacement of viscous crude oil is described in U.S. Pat. No. 3,282,337 (1966).

Another class of hydrophilic polymeric water thickening materials suitable for use in this invention is the polysaccharide compounds, many of which are readily available commercially. For example, in U.S. Pat. No. 3,208,518 there is disclosed a water flooding process wherein the viscosity of the flooding medium is increased by the use of high molecular weight polymers, specifically an ionic polysaccharide produced by the fermentation of carbohydrates by bacteria of the genus xanthomonas, under controlled pH conditions.

Many factors influence the apparent viscosity of aqueous solutions of hydrophilic polymers such as polyacrylamides or polysaccharides. The apparent viscosity of aqueous solutions of both polymers decreases with increasing shear rates, a characteristic of pseudoplastic fluids. The shear rate to which an injected fluid will be subjected in a subterranean formation will vary with the frontal velocity of the fluid and permeability of the formation, and is thought to be in the range of from about 10 to about 500 reciprocal seconds.

Aqueous solutions of polysaccharide or polyacrylamide can be treated as power law fluids, following the equation:

$$\text{apparent viscosity} = K \frac{du}{dy}^{n-1}$$

wherein $(du/dy)$ is the shear rate and $n$ is a flow behavior index. The flow behavior index $n$ is inversely related to the degree of pseudoplasticity, and will always be less than one for pseudoplastic fluids. Laboratory experiments have verified that apparent viscosity of hydrophilic polymers decreases with increasing shear rates. For example, the apparent viscosity of a 250 parts per million aqueous solution of polyacrylamide has been found to be about 13 centipoise at a shear rate of 10 reciprocal seconds, about 10 centipoise at a shear rate of 100 reciprocal seconds, and about 5 centipoise at a shear rate of 300 reciprocal seconds. A similar response was observed for a polysaccharide solution.

The apparent viscosity of these polymeric materials also decrease with increased temperature and increased salt concentrations. The decrease in viscosity is very rapid as salt concentration increases from 0 to about 5,000 parts per million, but remains relatively constant thereafter. For these reasons, the concentration of polymer needed must be adjusted to suit the salinity of the surface water available for preparing the preflush solution and the salinity desired for the particular surfactant being used.

The apparent viscosity is also very dependent on pH, with the maximum apparent viscosity occurring at a pH of about 6 to about 10 for polyacrylamide and at a pH of about 4 to about 9 for polysaccharide. The concentration of polymer can be adjusted according to the pH of the field water available for the preparation of the preflush solution, or the pH of the field water can be adjusted to the optimum range imposed by the polymer.

In any particular field operation, the choice of hydrophilic polymer is governed to a large extent by the characteristics of the formation, the formation water, and the field water available for preparing the aqueous polymer slug as described above. Actual samples of the formation and field waters should be obtained and tested with polymer before its use. Otherwise, the choice of polymer for this application will depend mainly on availability and local price since the only requirement is that a material be used which will increase the viscosity to a value above that of the formation water. In a particular application studied, it was found that from about 200 to about 500 parts per million of a commercially available polyacrylamide polymer yielded a solution having a viscosity from about 5 centipoise to about 15 centipose at a shear rate of 300 reciprocal seconds. The concentration of polymer needed will be to some influenced by the viscosity of the formation water, if a sample can be obtained and the viscosity measured. The residual oil saturation at the beginning of the supplemental oil recovery program also influences the polymer concentration required.

From about 0.02 to about 0.5 and preferably from 0.1 to about 0.3 pore volumes of the aqueous preflush solution containing the hydrophilic viscosity increasing polymer should be injected into the formation for the purpose of displacing the formation water from the flow channels in advance of the surfactant flood. It is desired that a sufficient volume of the preflush solution be used to insure that the discreteness of the solution is maintained throughout the formation. The quantity of preflush solution required will depend on the well spacing of the particular pattern being employed and the reservoir properties.

If the surfactant solution to be injected after the preflush solution has a viscosity less than the viscosity of the preflush solution, it will be necessary either to provide an isolation slug of from about 0.05 to about 0.5 pore volumes of untreated water between the preflush solution and the surfactant solution, or to taper the concentration of the viscosity increasing hydrophilic polymeric material in the preflush solution so the preflush solution viscosity goes from an initial maximum value to a viscosity at least equal to and preferably less than the viscosity of the subsequently injected surfactant solution.

Any surfactant otherwise usable in oil recovery operations may be used in the practice of this invention. The term surfactant is a fairly broad term meaning any compound with surface active properties. It is generally agreed that a compound must satisfy six requirements in order to be classed a surfactant: (1) It must be at least slightly soluble in at least one of the phases of a liquid system. (2) It must have an amphipathic structure (the molecule is comprised of groups with opposing solubility tendencies). In oil recovery applications this means there must be one or more hydrophilic or water soluble groups on the molecule and one or more hydrophobic or oil soluble groups on the molecule. (3) The surfactant molecules must tend to form oriented monolayers at phase interfaces. (4) The surfactant must tend to concentrate at the interface; that is, to have a concentration at the interface which is greater than the concentration in the bulk of the solution. (5) The material must tend to form aggregates of molecules or micelles whenever the concentration in a particular solute system exceeds a certain limiting value. (6) The material must display at least several of the following functional properties: detergency, foaming, wetting, emulsifying, solubilizing, and dispersing.

Surfactants are classified on the basis of the hydrophilic or water soluble groups in the molecule and are generally recognized as falling in one of the following groups:

1. Anionic, meaning the surfactant molecule has one or more anionic, hydrophilic or water soluble groups. The most typical of these groups are the carboxylates, sulfonates, sulfates, and phosphates. The anionic surfactants are by far the most important group, and are the surfactants of choice in oil recovery operations unless there are compelling reasons to resort to the use of other types of surfactants.

2. Cationic surfactants, wherein the hydrophilic or water soluble groups are primary, secondary or tertiary amines or quaternary ammonium groups.

3. Nonionic surfactants which are characterized by the occurrence of hydroxyl or polyoxyethylene chains which provide the hydrophilic character to the molecule.

4. An amphoteric group is sometimes recognized for molecules having combinations of anionic and cationic moieties present on the same molecule.

The hydrophobic or oil soluble component of a surfactant molecule is almost always a hydrocarbon or halogen substituted hydrocarbon.

The molecular weight of surfactants ranges from around 200 to several thousand molecular weight units. Commercially available surfactants are seldom composed essentially of the same molecular species; rather they are more often polydispersed compounds (the molecules all have the same functional groups but vary in chain length or some other structural detail).

Petroleum sulfonates are presently a very popular class of surfactants for supplemental oil recovery application. The various materials available under the general name of petroleum sulfonates differ in the boiling range of the petroleum fraction used for sulfonation and in the degree of sulfonation imparted to the petroleum fraction. A preferable petroleum sulfonate is described in U.S. Pat. No. 3,302,713 (1967) disclosing a petroleum sulfonate prepared from a petroleum fraction whose boiling range is from 700° to 1100°F. which corresponds to a molecular weight range of from about 350 to about 600. The sodium salt of the sulfonation product of this petroleum fraction is an excellent material for use in the subject invention.

Petroleum sulfonates are desirable surfactants to use for oil recovery operations because of their low cost per unit weight and relatively high surface activity. One serious shortcoming, however, is their low tolerance to salinity and polyvalent ions such as calcium and/or magnesium. For this reason, petroleum sulfonates are especially benefitted by the subject invention, which provides a means for displacing high salinity and/or hard formation water so the surfactant can function more effectively and in a relatively low concentration range. The upper limit of salinity tolerance for most commonly used petroleum sulfonates is around 2 percent or 20,000 parts per million and the upper limit for hardness is about 500 parts per million, although the optimum performance is realized at lower values. If the salinity of the formation water is in the range of 1 percent or less, or if it can be reduced to a level of 1 percent or less, the petroleum sulfonate solution will exhibit its maximum degree of surface activity and will function most efficiently at a lower concentration. Ordinarily, the concentration of petroleum sulfonate in the surfactant solution should be from about 0.05 percent to about 15 percent and preferably from about 0.1 percent to about 4.0 percent by weight. The quantity of surfactant solution to be injected will be from about 0.02 to about 0.5 percent pore volume. If a particularly viscous crude is to be displaced, it is necessary to include in the surfactant solution a quantity of hydrophilic polymer to increase the viscosity of the surfactant solution so that a more favorable mobility ratio will exist between the surfactant solution and the displaced formation petroleum. It is preferable to use the same hydrophilic polymeric material in the surfactant solution as was used in the preflush solution, although it is not essential to do so. In any event the viscosity of the surfactant solution should be slightly greater than the viscosity of the preflush solution, and so from about 50 to about 5,000 and preferably from about 200 to about 600 parts per million of the viscosity increasing hydrophilic polymer should be used therein. The surfactant solution will tend to accumulate droplets of oil dispersed in the solution, so the viscosity of the surfactant solution will increase as it progresses through the formation. For this reason, it is preferable to add a greater amount of the viscosity increasing hydrophilic polymer to the first portion of surfactant solution injected into the formation and a lesser amount of polymer to the later portions of the surfactant solution, since the viscosity of the later portions will be increased by the accumulation of dispersed oil droplets therein.

The multi-component surfactant combinations discussed above exhibit optimum performance at higher levels of salinity and/or hardness, than petroleum sulfonate and so there are instances where it is necessary to use a viscosified preflush whose salinity and/or hardness is greater than the salinity and/or hardness of the formation water.

If one is committed to the use of a certain type of surfactant by logistics or other factors then the proper method of applying this invention is to formulate an aqueous solution having a salinity and hardness corresponding to the optimum performance of the surfactant, add an amount of polymer determined experimentally to yield a viscosity greater than the formation water, and inject an effective quantity of this solution into the formation prior to injecting the surfactant solution.

Another method for practicing this process is to select a surfactant whose optimum performance range corresponds to or is nearest to the formation water salinity and/or hardness. If an acceptable surfactant can be found which provides optimum performance at a salinity and hardness equal to the formation water, then no preflush is required to adjust the salinity and hardness to insure optimum surfactant hardness. Often it is necessary to use a preflush to insure optimum performance of volumetric sweep.

In a slightly different embodiment, the optimum pH range for the surfactant being considered for use is also determined, and the aqueous preflush is formulated using the salinity, hardness and pH which correspond to the optimum interfacial tension reduction. The salinity, hardness and pH percent of the surfactant solution may also be adjusted to a value within the optimum range to further optimize the process.

The method of applying the process of our invention is best understood by reference to the following field examples, which are offered only as illustrative embodiments and are not intended to be limitative or restrictive.

FIELD EXAMPLE I

A petroleum-containing formation located at a depth of 5,000 feet is exploited by means of conventional water flood operations using repeated five spot patterns, until the water-oil ratio rises above about 30. The formation thickness is 50 feet and the porosity is 30 percent. The dimensions of the square grid on which an inverted five spot pattern is based is 500 feet and it is known that only 85 percent of the reservoir will be swept by the injected fluid using the standard five spot pattern. The pore volume of the pattern swept by the injected fluid will be $500 \times 500 \times 50 \times 0.3 \times 0.75 = 3,187,500$ cubic feet. The salinity of the water contained in the formation is known to be 60,000 parts per million which is far in excess of the tolerable salinity for petroleum sulfonate which has been chosen for use in the surfactant flood program. Accordingly, 0.2 pore volumes (637,500 cubic feet) of a preflush solution having a salinity of only 100 parts per million and having dissolved therein 250 parts per million of polyacrylamide to increase its viscosity to about 7 centipoise, is injected into the formation via the injection well. This is followed by the injection into the formation of 0.1 pore volumes (318,750 cubic feet) of aqueous solution of petroleum sulfonate surfactant having dissolved therein 2.5 percent by weight petroleum sulfonate, and also having dissolved therein 300 parts per million of polyacrylamide to increase the solution viscosity to 9 centipoise. Next 0.2 pore volume (332,000 cubic feet or 2.5 million gallons) of water containing 500 parts per million polysaccharide and having a viscosity of 10 centipoise is injected into the formation. This is followed by the injection of 0.2 pore volumes polymer tapered slug 500-0, a salinity of 100 parts per million to displace the oil, surfactant solution and thickened water through the formation. Oil is produced through the associated production wells in the five spot patterns, and the injection of water into the injection well and the production of oil from the producing wells is continued so long as the water-oil ratio remains below 30.

FIELD EXAMPLE II

A subterranean, limestone petroleum-containing formation located at a depth of 5,000 feet is water flooded to a high water cut, and is to be further exploited by surfactant flooding. The formation water after water flooding has a hardness of 3,500 parts per million and a salinity of 100,000 parts per million. Since it would be difficult to reduce such high salinity, hard water to a level in which petroleum sulfonate would be operable, it is decided to use a mixture of a normal dodecylbenzene sulfonate and a polyethoxy nonylphenol sulfate. Although this mixture is operable in the formation water hardness and salinity range, the optimum performance is obtained by raising the hardness to 7,000 parts per million and the salinity to 110,000 parts per million. The pH is adjusted to 7.5. Accordingly, a 0.12 pore volume slug of preflush formulated from water having 7,000 parts per million calcium and magnesium and 110,000 parts per million salinity and a pH of 8.5 containing 500 parts per million polyacrylamide yielding a viscosity of 3 centipoise, is injected into the formation. This is followed by a 0.20 pore volume slug of an aqueous surfactant solution having the same salinity, hardness and pH as the preflush and containing 0.5 percent normal dodecylbenzene sulfonate and 0.5 percent polyethoxy nonylphenol sulfate. A 0.10 pore volume solution of polysaccharide polymer is injected after the surfactant solution, following which water is injected to displace all of the foregoing materials through the formation.

EXPERIMENTAL

In order to establish the operability of the subject invention, laboratory experiments were conducted using a radial core obtained from a well drilled in the Slaughter Field in West Texas, which is known to contain very high salinity water, in the range of 250,000 parts per million. The core was filled with simulated connate water containing 250 grams of salt per liter, equivalent to a salinity of 250,000 parts per million total solids. Slaughter Field stock tank oil was used to saturate the core and the core was then water flooded with fresh water to a relatively high water-oil ratio. This was followed by a tertiary flood in which 1.5 pore volumes of preflush solution comprising relatively fresh water having dissolved therein 300 parts per million polyacrylamide was injected into the core. This was followed by a buffer slug of 0.25 pore volumes of relatively fresh water, which was followed by 0.3 pore volumes of surfactant solution containing 0.5 percent guanidine hydrochloride, 0.5 percent sodium oleate and 0.4 percent sodium hydroxide. This in turn was followed by 0.3 pore volumes of a viscous fluid comprising 300 parts per million polyacrylamide dissolved in fresh water, and finally the residual oil remaining in the core and the previously injected materials were displaced by injecting fresh water into the core. The data in Table I illustrates the results obtained. The results were generally quite satisfactory, as the residual oil saturation was reduced from 35.5 percent at the conclusion of the water flood to 15.5 percent at the conclusion of the tertiary flood.

TABLE I

| Time | Oil Recovery Percent of Oil Originally in Place | Residual Oil Saturation Percent Pore Volume |
|---|---|---|
| Conclusion of Water Flood | 31.0 | 35.5 |
| Conclusion of Viscous Preflush | 57.0 | 22.0 |
| Conclusion of Tertiary Flood | 69.5 | 15.5 |

Thus it has been shown that by injecting a controlled salinity and hardness preflush solution having dissolved therein sufficient hydrophilic polymeric material to increase its viscosity to a value from about 5 to about 15 centipoise into a formation containing formation water, the formation water can be displaced sufficiently to permit the effective use of a surfactant the optimum performance of which does not occur at the salinity and/or hardness level of the formation water. Various modification and embodiments of this invention are apparent from the foregoing description and examples, and further modifications will be apparent to those skilled in the art of secondary and tertiary oil recovery. It is our intent to encompass such modifications within the scope of this invention as are defined in the claims below.

We claim:

1. In a method of recovering petroleum from a porous, subterranean, petroleum-containing formation penetrated by at least one injection well and at least one production well, wherein a surfactant solution is injected into the formation, the improvement for increasing the efficiency of the surfactant which comprises:
    a. determining the range of salinity and polyvalent ion concentrations for which the surfactant produces the minimum interfacial tension between water and formation petroleum; and
    b. injecting an aqueous solution of a hydrophilic polymeric viscosity increasing material, said aqueous preflush solution having a salinity and polyvalent ion concentration within the optimum performance range as determined in step (a), into the formation prior to injecting the surfactant solution, to displace the formation water through the formation ahead of the surfactant solution.

2. A method as recited in claim 1 wherein the hydrophilic polymeric viscosity increasing material is selected from the group consisting of polyacrylamide, polysaccharide, methyl cellulose, carboxy methyl cellulose, polyvinyl aromatic sulfonate and polyethylene oxide.

3. A method as recited in claim 2 wherein the hydrophilic polymeric material is polyacrylamide.

4. A method as recited in claim 2 wherein the hydrophilic polymeric material is polysaccharide.

5. A method as recited in claim 2 wherein the hydrophilic polymeric material is methyl cellulose.

6. A method as recited in claim 2 wherein the hydrophilic polymeric material is polyvinyl aromatic sulfonate.

7. A method as recited in claim 2 wherein the hydrophilic polymeric material is polyethylene oxide.

8. A method as recited in claim 1 wherein the concentration of hydrophilic polymeric material in the aqueous preflush solution is from about 25 to about 2,000 parts per million.

9. A method as recited in claim 1 wherein the concentration of polymeric material in the aqueous preflush solution is from about 200 to about 500 parts per million.

10. A method as recited in claim 1 wherein from about 0.2 to about 0.5 pore volumes of the aqueous preflush solution is injected into the formation.

11. A method as recited in claim 1 wherein from about 0.1 to about 0.3 pore volumes of the aqueous preflush solution is injected into the formation.

12. A method as recited in claim 1 wherein the concentration of hydrophilic polymer in the aqueous preflush solution is decreased with time as the aqueous preflush solution is injected into the formation.

13. A method as recited in claim 1 wherein an isolation slug of from about 0.05 to about 0.5 pore volumes of water having a salinity less than the salinity of the formation water is injected into the formation after the injection of the aqueous preflush solution and before the injection of the surfactant solution.

14. A method as recited in claim 1 wherein the salinity of the aqueous preflush solution is from 0 to about 20,000 parts per million.

15. A method as recited in claim 1 wherein the concentration of polyvalent ions in the preflush is from about 0 to about 18,000 parts per million.

16. A method as recited in claim 1 wherein the optimum salinity and polyvalent ion concentration for minimum interfacial tension production is determined by capillary displacement tests.

17. A method as recited in claim 1 comprising the additional step of determining the pH at which the surfactant produces the minimum interfacial tension and adjusting the pH of the aqueous preflush solution to a value essentially equal to the determined value.

18. A method as recited in claim 17 wherein the pH of the surfactant solution is essentially equal to the pH of the preflush solution.

19. A method as recited in claim 1 wherein the salinity and hardness of surfactant solution is essentially equal to the preflush solution.

20. A method as recited in claim 1 wherein the aqueous solution of a hydrophilic polymeric viscosity increasing material additionally contains sacrificial agents to lower adsorption of surfactant from the surfactant solution injected after the aqueous solution of hydrophilic polymeric material.

21. A method as recited in claim 20 wherein the sacrificial agents are added to lower adsorption of polymer.

* * * * *